(12) United States Patent
Mutobe et al.

(10) Patent No.: US 10,888,966 B2
(45) Date of Patent: Jan. 12, 2021

(54) MACHINE TOOL

(71) Applicant: FANUC CORPORATION, Yamanashi (JP)

(72) Inventors: Kei Mutobe, Yamanashi (JP); Noboru Kurokami, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/822,607

(22) Filed: Mar. 18, 2020

(65) Prior Publication Data
US 2020/0298361 A1 Sep. 24, 2020

(30) Foreign Application Priority Data

Mar. 19, 2019 (JP) .................. 2019-050833
Aug. 7, 2019 (JP) .................. 2019-145728

(51) Int. Cl.
| | | |
|---|---|---|
| *G08B 21/00* | (2006.01) | |
| *B23Q 17/09* | (2006.01) | |
| *B23Q 17/10* | (2006.01) | |
| *B23Q 17/00* | (2006.01) | |

(52) U.S. Cl.
CPC ..... *B23Q 17/0957* (2013.01); *B23Q 17/0961* (2013.01); *B23Q 17/10* (2013.01); *B23Q 2017/001* (2013.01)

(58) Field of Classification Search
CPC ......... B23Q 17/0957; B23Q 2017/001; B23Q 17/10; B23Q 17/0961; B23Q 17/00; B23Q 17/09; G06F 17/50; B23B 49/00; B23B 9/08; B23B 1/00; F16C 2322/39; G08B 21/187
See application file for complete search history.

(56) References Cited

U.S. PATENT DOCUMENTS

| | | | | |
|---|---|---|---|---|
| 4,642,005 A | * | 2/1987 | Kondo | ............... B23B 31/028 408/130 |
| 6,467,381 B1 | * | 10/2002 | Frecska | ............... B23B 31/00 409/232 |
| 7,048,479 B2 | * | 5/2006 | Murai | ............... B23Q 5/045 408/137 |
| 10,124,457 B2 | * | 11/2018 | Inaguchi | ............ G08B 25/08 |

FOREIGN PATENT DOCUMENTS

| | | |
|---|---|---|
| JP | 8-197384 | 8/1996 |
| JP | 2017-7030 | 1/2017 |

* cited by examiner

*Primary Examiner* — Toan N Pham
(74) *Attorney, Agent, or Firm* — Wenderoth, Lind & Ponack, L.L.P.

(57) ABSTRACT

A machine tool for machining a workpiece includes a spindle configured to rotate a holder mounted with a tool used for machining, one or more moving shafts configured to move the holder and/or a work base on which the workpiece is placed, a torque measurement unit configured to measure driving torque of the spindle and/or the one or more moving shafts, a reference value calculation unit configured to use, as a reference value, the driving torque measured by performing a no-load operation by rotating the spindle in a normal state, a torque comparison unit configured to compare, to the reference value, the driving torque measured by performing a no-load operation by rotating the spindle before actual machining, and an alarm unit configured to determine whether to issue an alarm on the basis of results of the comparison.

9 Claims, 13 Drawing Sheets

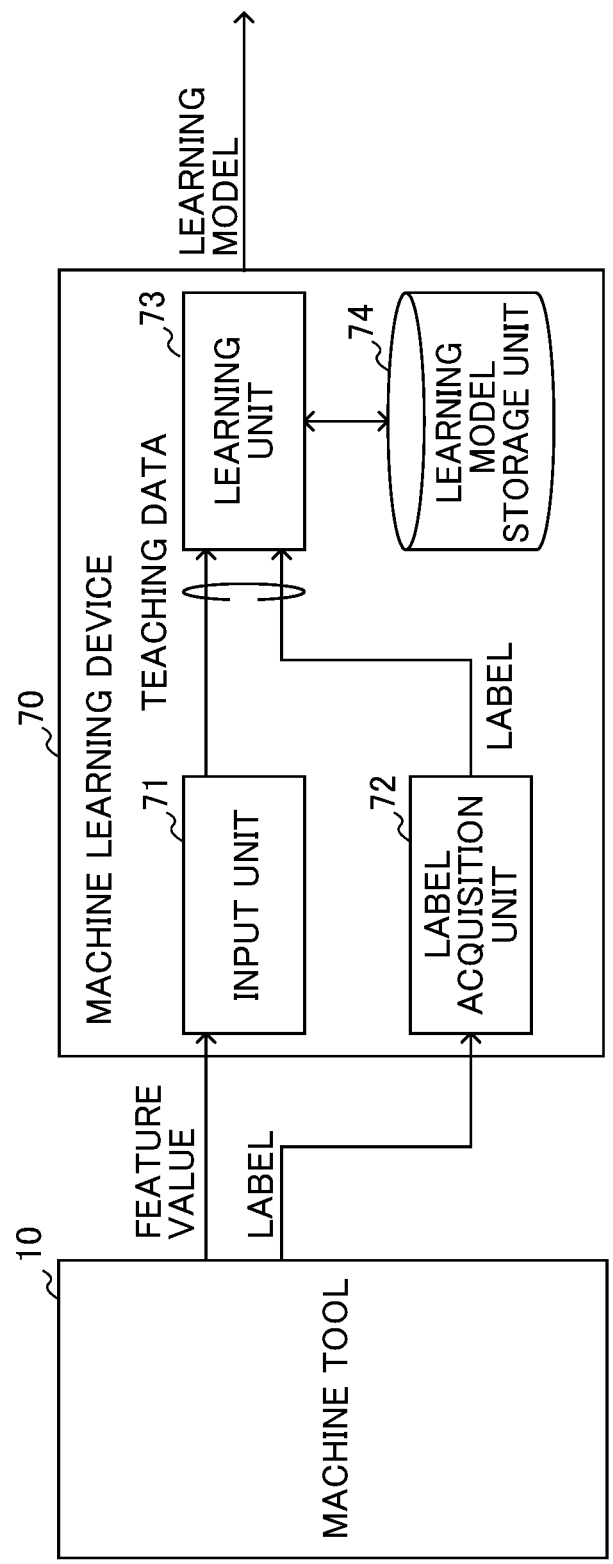

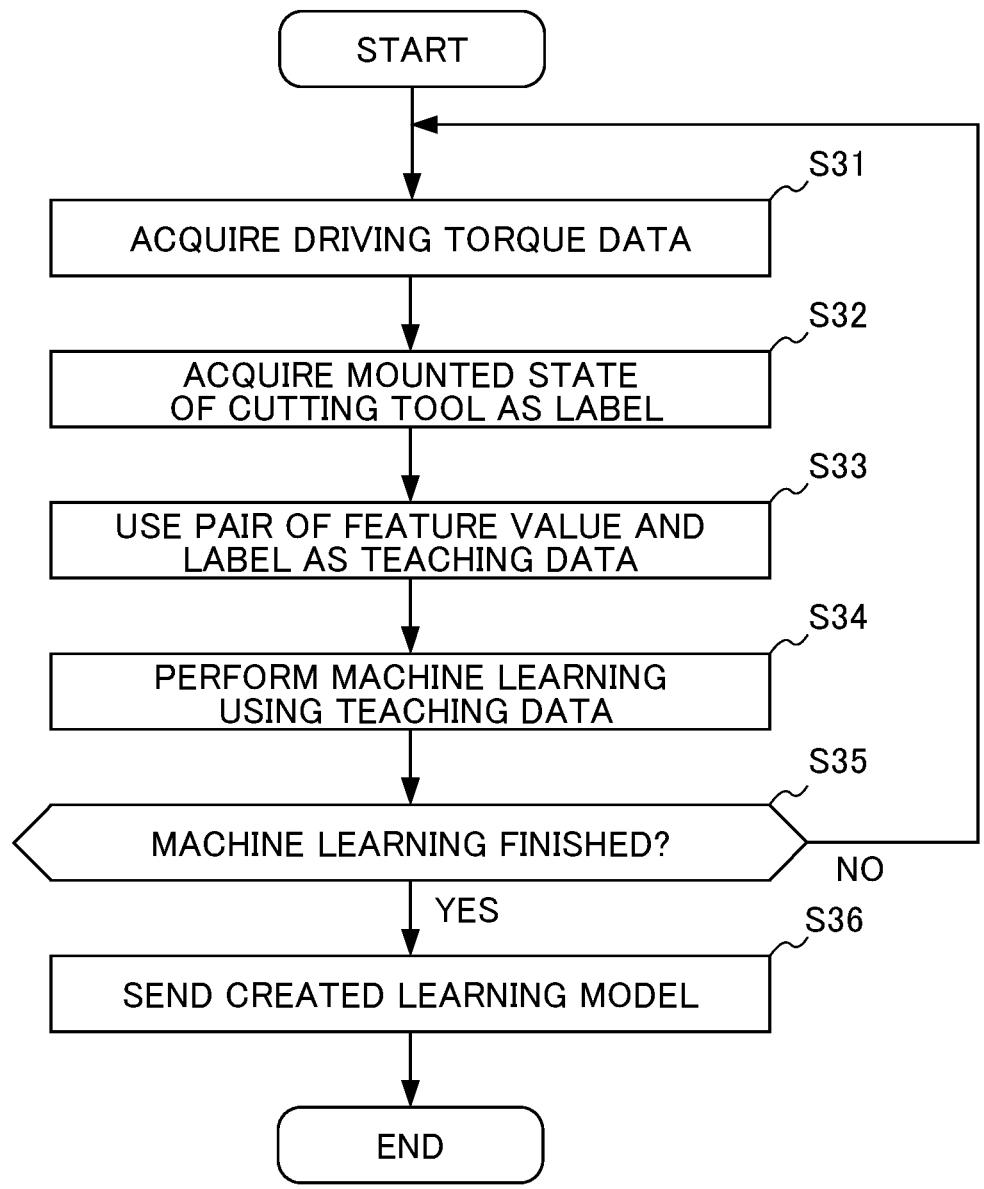

MACHINE TOOL

This application is based on and claims the benefit of priority from Japanese Patent Application No. 2019-050833, filed on 19 Mar. 2019, and Japanese Patent Application No. 2019-145728, filed on 7 Aug. 2019, the content of which are incorporated herein by reference.

BACKGROUND OF THE INVENTION

Field of the Invention

The present invention relates to a machine tool.

Related Art

In a machine tool, foreign material such as chips may become jammed in the tool holder when, for example, the tool is replaced. Machining errors such as workpiece misalignment, center misalignment, and irregular machining surfaces may occur when chips become jammed in the machine tool, and these errors lead to run-out of the spindle.

FIG. 1 is a diagram for illustrating foreign material 54 being jammed in a tapered portion 53 of a tool holder 52, which holds a cutting tool 51. As illustrated in FIG. 1, the jamming of the foreign material 54 causes the tool 51 to shift eccentrically when the spindle rotates.

In addition to foreign material becoming jammed in the tool holder 52, run-out of the cutting tool 51 held by the tool holder 52 may also be caused by, for example, incorrect mounting of the cutting tool 51 due to wear at the tapered portion, a faulty tool chuck, and breaks or bends in the cutting tool 51.

One known technology for detecting cutting tool run-out in a machine tool involves installing a sensor around where the cutting tool is held in the holder and using the sensor to directly detect cutting tool run-out (see, for example, Patent Documents 1 and 2).

Patent Document 1: Japanese Unexamined Patent Application, Publication No. 2017-007030
Patent Document 2: Japanese Unexamined Patent Application, Publication No. H08-197384

SUMMARY OF THE INVENTION

However, retrofitting a sensor for detecting run-out of a cutting tool invites numerous problems such as the high cost of each installed sensor, wiring for installing the sensor, and deterioration of the sensor caused by cutting fluid. Thus, there is a need for a machine tool that is capable of detecting cutting tool run-out without the need to add a sensor for detecting cutting tool run-out.

One aspect of the present disclosure is a machine tool for machining a workpiece, the machine tool including a spindle configured to rotate a holder mounted with a tool used for machining, one or more moving shafts configured to move the holder and/or a work base on which the workpiece is placed, a torque measurement unit configured to measure driving torque of the spindle and/or the moving shaft, a reference value calculation unit configured to use, as a reference value, the driving torque measured by performing a no-load operation by rotating the spindle in a normal state, a torque comparison unit configured to compare, to the reference value, the driving torque measured by performing a no-load operation by rotating the spindle before actual machining, and an alarm unit configured to determine whether to issue an alarm on the basis of results of the comparison.

According to one aspect, a machine tool is capable of detecting cutting tool run-out without the need to add a sensor for detecting cutting tool run-out.

BRIEF DESCRIPTION OF THE DRAWINGS

FIG. 13 is a functional block diagram of a machine learning device included in a machining system according to one embodiment.

FIG. 14 is a flowchart illustrating operation of a machine learning device included in a machining system according to one embodiment.

DETAILED DESCRIPTION OF THE INVENTION

1. First Embodiment

Figure 2:
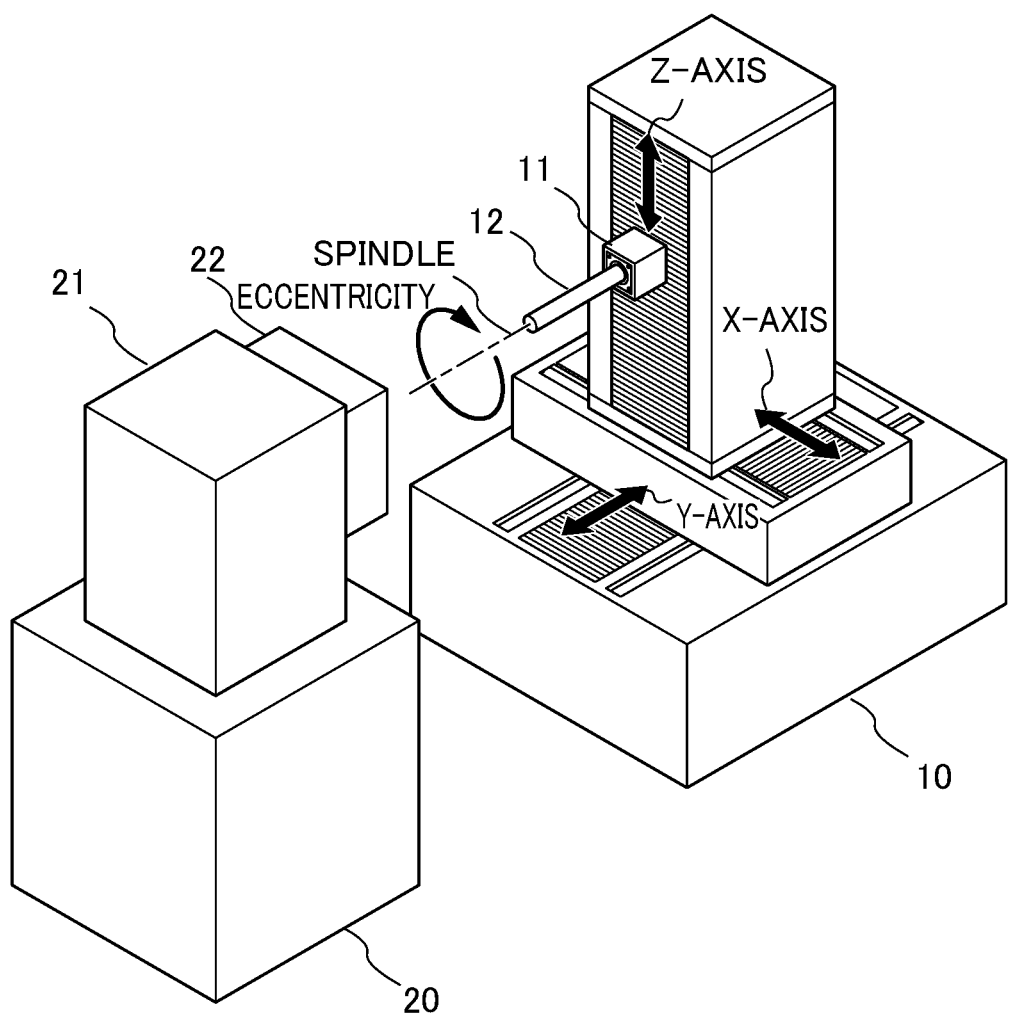
FIG. 2 is a diagram for illustrating a machine tool and a work base on which a workpiece is placed according to one embodiment.
Figure 3:
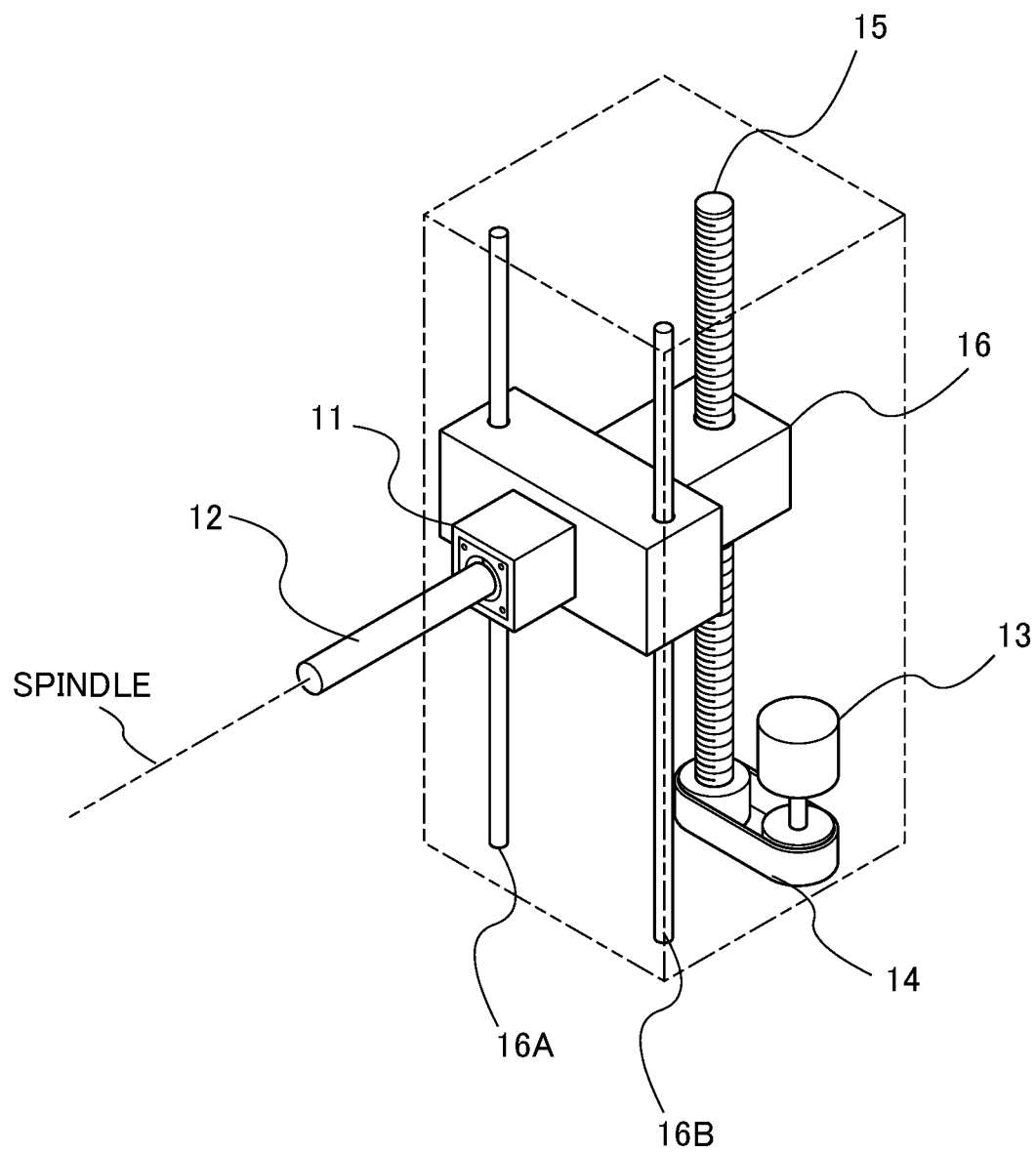
FIG. 3 is a diagram for illustrating a movement mechanism for a spindle in a machine tool according to one embodiment.
Figure 4:
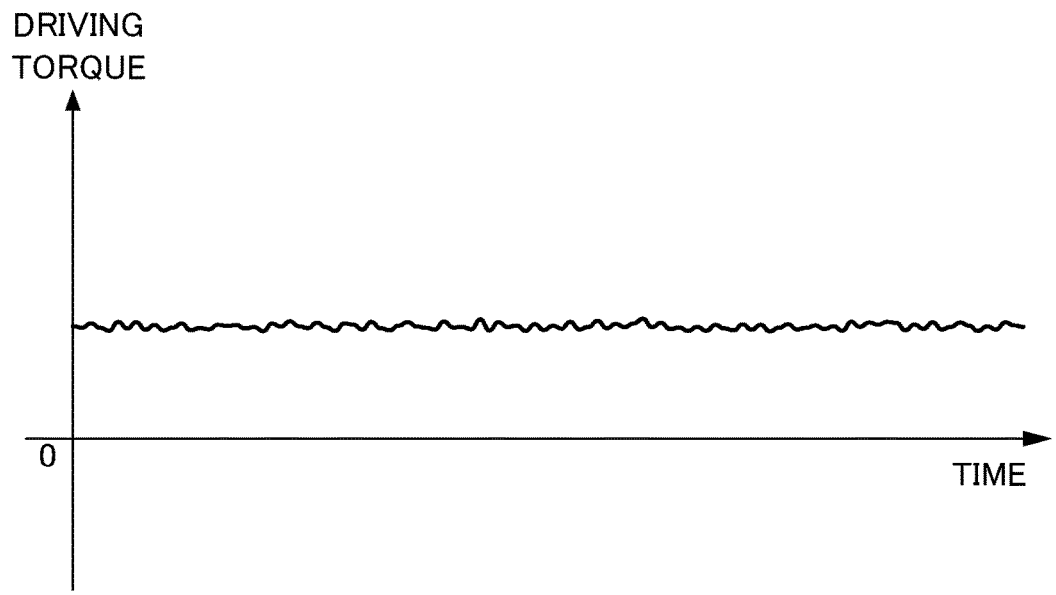
FIG. 4 is a graph showing change over time of driving torque during normal operation.
Figure 5:
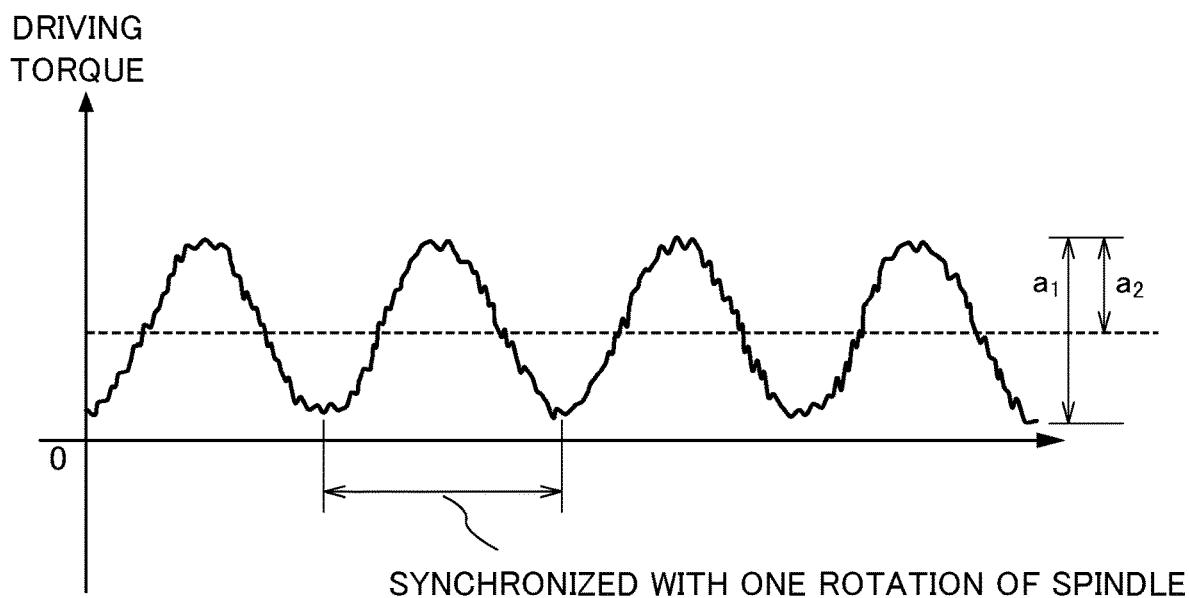
FIG. 5 is a graph showing change over time of driving torque during irregular operation.
Figure 6:
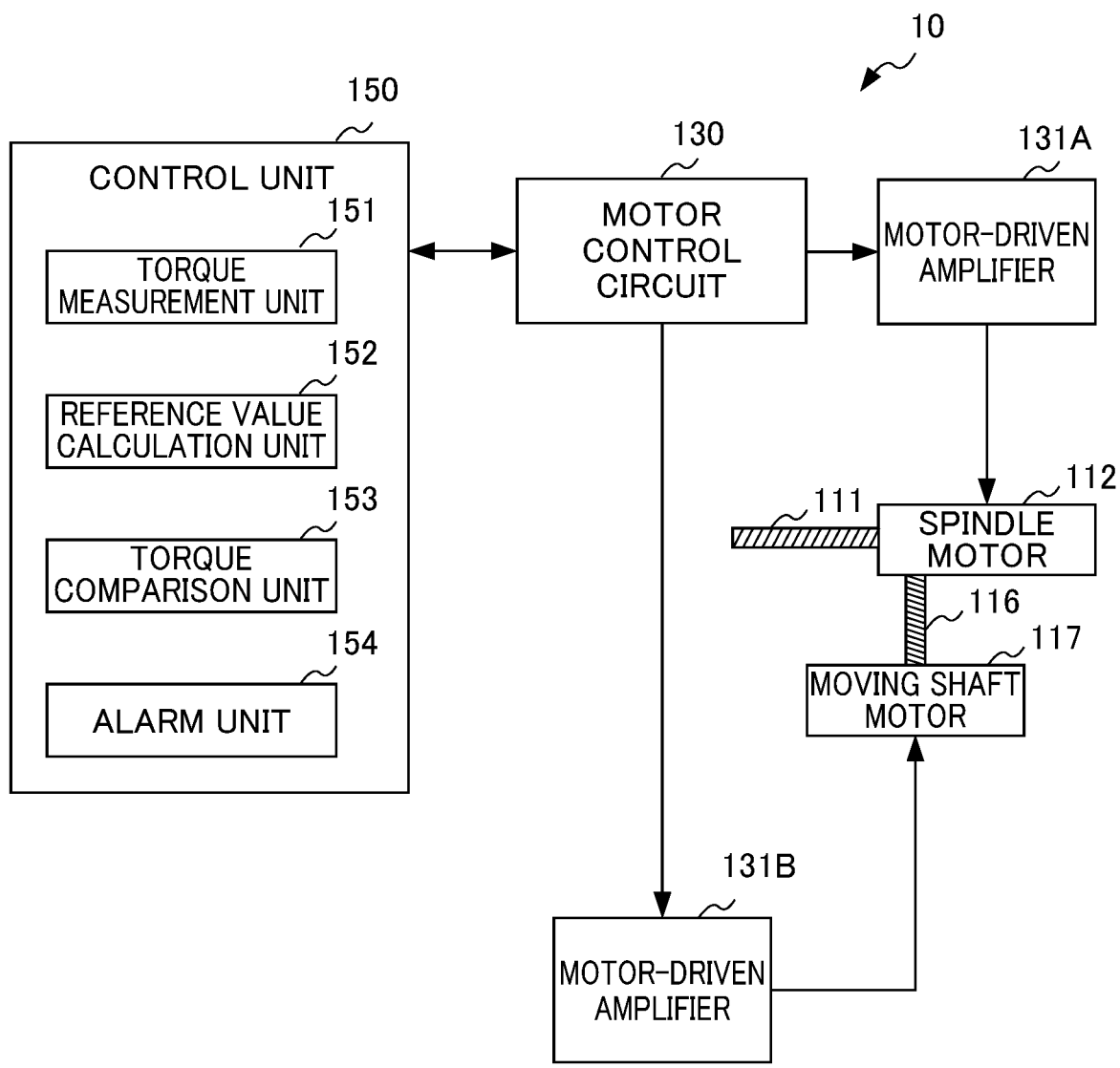
FIG. 6 is a functional block diagram of a machine tool according to one embodiment.
Figure 7:
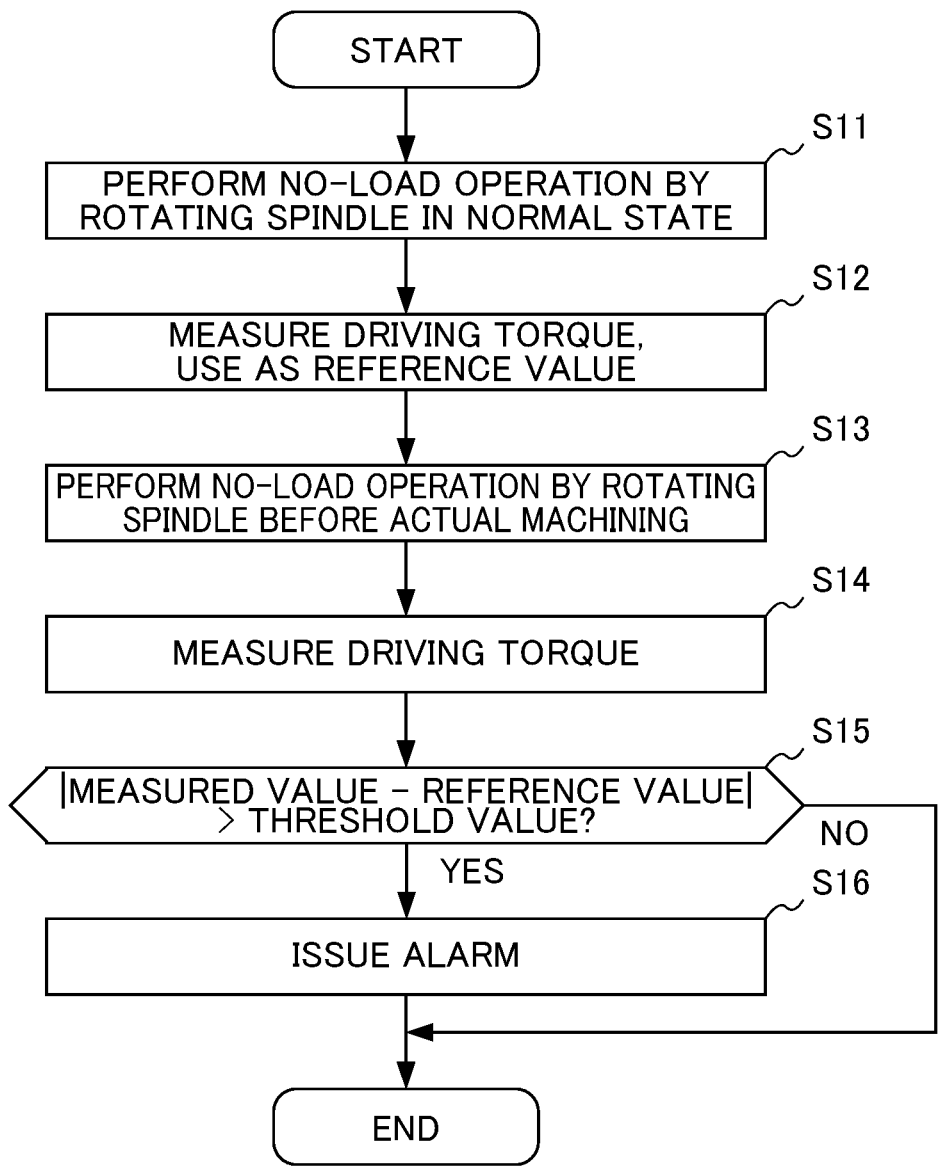
FIG. 7 is a flowchart illustrating operation of a machine tool according to one embodiment.

A first embodiment of the present invention will be described with reference to FIGS. 2 to 7. FIG. 2 is a diagram for illustrating a machine tool and a work base on which a workpiece is placed according to one embodiment. FIG. 3 is a diagram for illustrating a movement mechanism for moving a spindle in the machine tool illustrated in FIG. 2 in a Z-axis direction. FIG. 4 is a graph showing change over time of driving torque during normal operation. FIG. 5 is a graph showing change over time of driving torque during irregular operation. FIG. 6 is a functional block diagram of the machine tool according to the present embodiment. FIG. 7 is a flowchart illustrating operation of the machine tool according to the present embodiment.

1.1. Overview of Invention

First, an overview of the invention according to the first embodiment will be described with reference to FIGS. 2 to 5. In FIG. 2, a machine tool 10 includes a spindle and X-, Y- and Z-axes as movement axes for supporting the spindle. A cutting tool 12 is mounted to a holder 11 that rotates the spindle. The cutting tool 12 rotates to cut a workpiece 22 that is fixed to a jig 21 and placed on a work base 20.

In FIG. 3, the holder 11 and the cutting tool 12 of the machine tool 10 include a movement axis driving motor 13 that rotates, and this rotation is transmitted to a ball screw 15 via a timing belt 14 to rotate the ball screw 15. The ball screw 15 is for moving linearly along the Z-axis. When the ball screw 15 rotates, a nut 16 that engages with the ball screw 15 moves in the axial direction of the ball screw 15 and causes the holder 11 fixed to the nut 16 to move in the Z-axis direction along linear guide bearings 16A and 16B provided along the Z-axis direction. As a result, the spindle and the cutting tool 12, which rotates about the spindle, move in the Z-axis direction.

Figure 1:
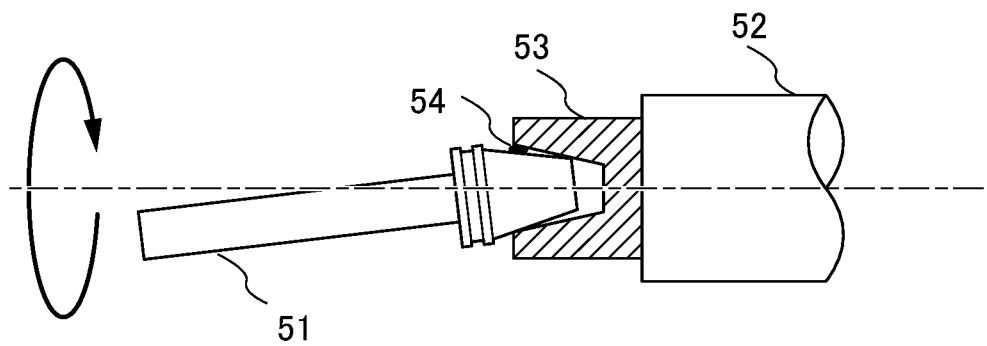
FIG. 1 is a diagram for illustrating foreign material becoming jammed in a tapered portion of a tool holder.

As described above with reference to FIG. 1, when the cutting tool 12 moves eccentrically due to foreign material being jammed in the tapered portion of the holder 11, as illustrated in FIG. 2, eccentricity occurs when the spindle rotates and a reaction force is generated in the X-, Y- and Z-axes, which are the movement axes that support the spindle. This reaction force synchronizes with the rotation of the spindle to become reaction torque of the movement axis driving motor 13 illustrated in FIG. 3. More specifically, in FIG. 3, when reaction force synchronized with rotation of the spindle is generated, this reaction force is transmitted to the ball screw 15 via the holder 11 supporting the cutting tool 12 that rotates about the spindle and further becomes reaction torque of the movement axis driving motor 13 via the timing belt 14.

As illustrated in FIG. 4, driving torque during normal operation fluctuates at minute widths but generally maintains a prescribed value. However, when whirling occurs as the result of eccentricity synchronized with rotation of the spindle as described above, reaction torque is generated as illustrated in FIG. 5, and driving torque has a periodic waveform synchronized with one rotation of the spindle. Whirling due to eccentricity occurs when chips become jammed in the tapered portion, the cutting tool moves eccentrically due to wear at the tapered portion, the chuck is faulty, or the cutting tool is broken or bent.

The component of the reaction torque included in the driving torque of the moving axis driving motor 13 is difficult to measure because this component is hidden within driving torque. This occurs because a large force is generated by the reaction force of machining itself.

Thus, driving torque of the moving axis driving motor 13 is measured by rotating the spindle at no-load at a constant rotation speed before machining is started, that is, when the cutting tool 12 is not in contact with the workpiece 22 and no machining is performed.

During normal operation, no reaction torque is generated due to whirling caused by eccentricity. Thus, driving torque on the movement axes at this time is taken as a normal reference. After setting the normal reference, the spindle is rotated at no-load at a constant rotation speed before actual machining is started, and driving torque of the movement axis driving motor 13 is measured. Then, this driving torque is compared to the normal reference to detect an abnormality related to run-out of the cutting tool 12, to issue an alarm when abnormality.

The spindle of the machine tool 10 is often designed and assembled to smoothly rotate in view of ensuring machining accuracy. Thus, it is thought that a disturbance component is smaller than a variance component in the driving torque during normal operation, that is, a periodic component associated with whirling when eccentricity occurs.

In the present embodiment, assuming that described above, the range of fluctuation ($a_1$ in FIG. 5) of the driving torque generated during a no-load operation before actual machining when the rotation speed of the spindle is constant may be compared to a reference value, which is a normal range of fluctuation. Alternatively, the maximum value ($a_2$ in FIG. 5) of the driving torque may be compared to a reference value that is a maximum value during normal operation.

As the method of comparison, the difference between a reference value as a range of fluctuation of the driving torque generated during a normal no-load operation and a range of fluctuation of the driving torque generated during a no-load operation before actual machining may be determined, and the absolute value of that difference may be compared to a threshold value equal to approximately 20% of the reference value. Alternatively, the difference between a reference value as the maximum value of driving torque generated during a normal no-load operation and the maximum value of driving torque generated during a no-load operation before actual machining may be determined, and the absolute value of that difference may be compared to a threshold value equal to approximately 20% of the reference value. Setting a margin for the fluctuation component caused by disturbance makes it possible to reduce incorrect detection of abnormalities.

1.2. Configuration of Invention

FIG. 6 is a functional block diagram of the machine tool 10. As illustrated in FIG. 6, the machine tool 10 performs machining using a spindle 111 mounted with a cutting tool and rotated by a spindle motor 112, and a moving shaft 116 that feeds out the spindle 111. In other words, the spindle motor 112 configured to drive the spindle 111 rotates the cutting tool, and the cutting tool is fed out by a moving shaft motor 117 that drives the moving shaft 116. In working examples, the machine tool 10 is described as a cutting machine, but the machine tool 10 is not limited thereto.

The machine tool 10 includes, in addition to the spindle 111, the spindle motor 112, the moving shaft 116, and the moving shaft motor 117 described above, a motor control circuit 130, motor-driven amplifiers 131A and 131B, and a control unit 150. The motor control circuit 130 calculates operation commands for driving the spindle motor 112 and the moving shaft motor 117. The motor-driven amplifier 131A amplifies the operation commands and outputs the operation commands to the spindle motor 112. The motor-driven amplifier 131B amplifies the operation commands and outputs the operation commands to the moving shaft motor 117.

The control unit 150 is a component that entirely controls the machine tool 10. The control unit 150 reads out and runs various programs from a storage area, for example, a ROM, a RAM, a flash memory, or a hard disk drive (HDD) to implement the various functions of the present embodiment. The control unit 150 may be a CPU. The control unit 150 includes a torque measurement unit 151, a reference value calculation unit 152, a torque comparison unit 153, and an alarm unit 154.

The torque measurement unit 151 measures driving torque of the spindle 111 and the moving shaft 116. The torque measurement unit 151 may calculate the driving torque on the basis of, for example, load current used for driving the spindle motor 112 and the moving shaft motor 117. Alternatively, the torque measurement unit 151 may measure the driving torque using magnetostrictive torque sensors provided to the spindle 111 and the moving shaft 116.

The reference value calculation unit 152 uses the driving torque that is measured by the torque measurement unit 151 when the machine tool 10 performs a no-load operation by rotating the spindle in a normal state as a reference value. As described above, the reference value calculation unit 152 may use the maximum value of normal driving torque or run-out width of the driving torque as the reference value.

The torque comparison unit 153 compares driving torque measured by performing a no-load operation by rotating the spindle with the machine tool 10 before actual machining with the reference value. More specifically, the torque comparison unit 153 may compare the driving torque before actual machining and the reference value by determining whether the absolute value of the difference between the driving torque measured before actual machining and the reference value exceeds a threshold value. The threshold value may be a predetermined percentage of the reference value, for example, 20% of the reference value.

The alarm unit 154 determines whether to issue an alarm on the basis of the results of comparison by the torque comparison unit 153. More specifically, the alarm unit 154 may issue and alarm when the torque comparison unit 153 determines that the absolute value of the difference between the driving torque before actual machining and the reference value has exceeded the threshold value.

1.3. Operation of Invention

FIG. 7 is a flowchart illustrating operation of the machine tool 10. In Step S11, the machine tool 10 performs a no-load operation by rotating the spindle during normal operation based on control by the motor control circuit 130.

In Step S12, the torque measurement unit 151 measures the driving torque and the reference value calculation unit 152 uses the measured value of the driving torque as a reference value.

In Step S13, the machine tool 10 performs a no-load operation by rotating the spindle before actual machining based on control by the motor control circuit 130.

In Step S14, the torque measurement unit 151 measures the driving torque.

In Step S15, if the absolute value of the difference between the measured value and the reference value exceeds a threshold value (S15: YES), the processing moves to Step S16. If the absolute value of the difference between the measured value and the reference value is equal to or less than the threshold value (S15: NO), the processing ends.

In Step S16, the alarm unit 154 issues an alarm.

1.4. Effects of the Invention

The machine tool 10 according to the present embodiment is a machine tool for machining a workpiece, the machine tool 10 including the spindle 111 configured to rotate the holder 11 mounted with a tool used for machining, one or more moving shafts 116 configured to move the holder 11 and/or the work base on which the workpiece 22 is placed, the torque measurement unit 151 configured to measure driving torque of the spindle 111 and/or the moving shaft 116, a reference value calculation unit 152 configured to use, as a reference value, the driving torque measured by performing a no-load operation by rotating the spindle in a normal state, a torque comparison unit 153 configured to compare, to the reference value, the driving torque measured by performing a no-load operation by rotating the spindle before actual machining, and an alarm unit 154 configured to determine whether to issue an alarm on the basis of results of the comparison.

With this configuration, the machine tool is capable of detecting tool run-out without the need to add a sensor for detecting tool run-out.

Further, the rotation speed of the spindle 111 during the no-load operation may be a constant value, the reference value calculation unit 152 may use the maximum value or run-out width of the normal driving torque as the reference value, and the torque comparison unit 153 may compare the maximum value of the driving torque before machining or the run-out width to the reference value.

With this configuration, the torque comparison unit 153 can compare the driving torque and the reference value in a simple manner.

2. Second Embodiment

Figure 8:
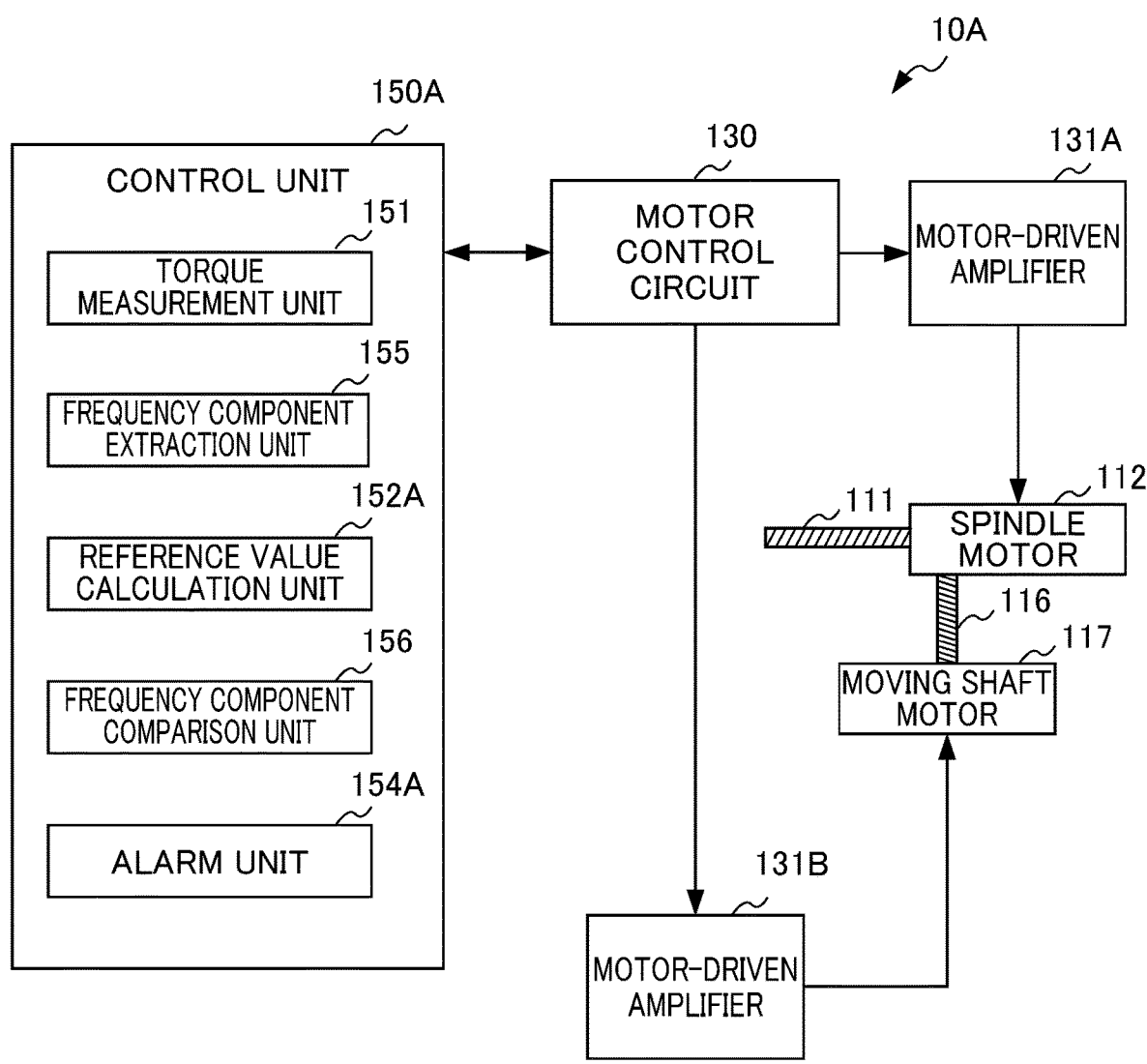
FIG. 8 is a functional block diagram of a machine tool according to one embodiment.
Figure 9:
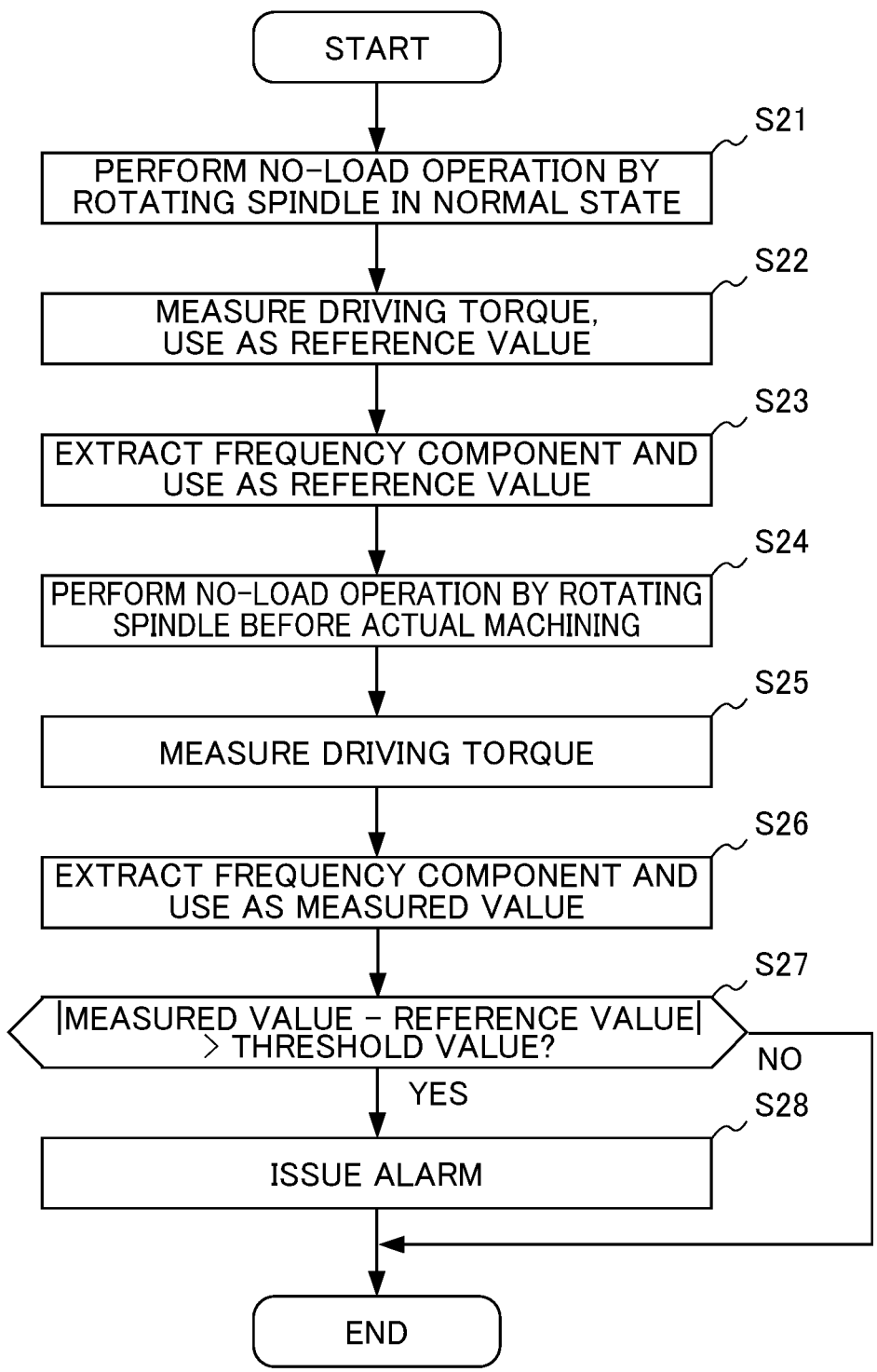
FIG. 9 is a flowchart illustrating operation of a machine tool according to one embodiment.

A second embodiment of the present invention will be described below with reference to FIGS. 8 and 9. FIG. 8 is a functional block diagram of a machine tool according to the present embodiment. FIG. 9 is a flowchart illustrating operation of the machine tool according to the present embodiment.

2.1. Outline of Invention

First, an outline of the invention according to the second embodiment will be described.

In the first embodiment, the fluctuation width of the driving torque or the maximum value of the driving torque is compared to a normal reference value under the assumption that a disturbance component is smaller than a whirling periodic component when eccentricity occurs.

Thus, frequency analysis is performed on the torque generated at the moving shaft to extract only a particular frequency component synchronized with the spindle rotation speed, and the value of that frequency component is compared to the normal reference value. As a result, it is possible to separate a disturbance torque component in the driving torque generated from an element such as a bearing in the driving system, and hence there is no need to assume that the disturbance component is smaller than the whirling periodic component when eccentricity occurs The value of the frequency component may be, for example, an amplitude value. As the amplitude value, peak amplitude, root mean square amplitude (RMS), power, or power spectral density (PSD) may be used. When the measured value before actual machining is started, is compared to the normal reference value and the amplitude value is used as the value of the frequency component, it is possible to detect eccentricity during spindle rotation caused by cutting tool run-out.

2.2. Configuration of Invention

FIG. 8 is a functional block diagram of a machine tool 10A. In the following description, primarily only differences between the machine tool 10A and the machine tool 10 will be described and descriptions of common components will generally be omitted.

The machine tool 10A differs from the machine tool 10 in that the machine tool 10A includes a control unit 150A in place of the control unit 150. The control unit 150A differs from the control unit 150 in that the control unit 150A does not include the torque comparison unit 153 and instead includes a frequency component extraction unit 155 and a frequency component comparison unit 156. The control unit 150A also includes a reference value calculation unit 152A in place of the reference value calculation unit 152 and an alarm unit 154A in place of the alarm unit 154.

The frequency component extraction unit 155 performs analysis using fast Fourier transform (FFT) on the driving torque measured by the torque measurement unit 151, to thereby extract a frequency component synchronized with the rotation speed of the spindle 111. More specifically, the frequency component extraction unit 155 performs FFT calculation on the driving torque of the spindle 111 and/or the moving shaft 116 measured by the torque measurement unit 151 to obtain the power spectral of the driving torque, and outputs the value of the frequency component synchronized with the rotation speed of the spindle 111 to the reference value calculation unit 152A and the frequency component comparison unit 156 to be described later. As described above, the value of the frequency component may be, for example, an amplitude value and the amplitude value may be peak amplitude, root mean square amplitude (RMS), power, or power spectral density (PSD).

The reference value calculation unit 152A uses the value of the frequency component extracted by the frequency component extraction unit 155 when the machine tool 10A performs a no-load operation by rotating the spindle in a normal state as a reference value.

The frequency component comparison unit 156 compares the reference value and the value of the frequency component extracted by the frequency component extraction unit 155 through the machine tool 10A performing a no-load operation by rotating the spindle before actual machining. More specifically, the frequency component comparison unit 156 may compare the reference value and the value of the frequency component before actual machining by determining whether the absolute value of the difference between the reference value and the value of the frequency component extracted before actual machining exceeds a threshold value. The threshold value in this case may be a predetermined percentage of the reference value, for example, 20% of the reference value.

The alarm unit 154A determines whether to issue an alarm'yoy on the basis of the results of comparison by the frequency component comparison unit 156. More specifically, the alarm unit 154A may issue an alarm when the frequency component comparison unit 156 determines that the absolute value of the difference between the reference value and the value of the frequency component before actual machining exceeds the threshold value.

2.3. Operation of Invention

FIG. 9 is a flowchart illustrating operation of the machine tool 10A. In Step S21, the machine tool 10A performs a no-load operation by rotating the spindle during normal operation based on control by the motor control circuit 130.

In Step S22, the torque measurement unit 151 measures the driving torque. In Step S23, the frequency component extraction unit 155 extracts the frequency component from the measured driving torque and the reference value calculation unit 152A uses the value of the extracted frequency component as a reference value.

In Step S24, the machine tool 10A performs a no-load operation by rotating the spindle before actual machining based on control by the motor control circuit 130.

In Step S25, the torque measurement unit 151 measures the driving torque.

In Step S26, the frequency component extraction unit 155 extracts the frequency component from the measured driving torque and uses the value of the extracted frequency component as a measured value.

In Step S27, if the absolute value of the difference between the measured value and the reference value exceeds the threshold value (S27: YES), the processing moves to Step S28. If the absolute value of the difference between the measured value and the reference value is equal to or less than the threshold value (S27: NO), the processing ends.

In Step S28, the alarm unit 154A issues an alarm.

2.4. Effects of Invention

The machine tool 10A according to the present embodiment is a machine tool for machining a workpiece, the machine tool including the spindle 111 configured to rotate the holder 11 mounted with a tool used for machining, one or more moving shafts 116 configured to move the holder 11 and/or a work base on which the workpiece 22 is placed, the torque measurement unit 151 configured to measure driving torque of the spindle 111 and/or the moving shaft 116, the frequency component extraction unit 155 configured to analyze the driving torque using FFT and extract a frequency component synchronized with rotation speed of the spindle 111, the reference value calculation unit 152A configured to use, as a reference value, a value of the frequency component extracted by performing a no-load operation by rotating the spindle in a normal state, the frequency component comparison unit 156 configured to compare, to the reference value, the value of the frequency component extracted by performing a no-load operation by rotating the spindle before actual machining, and the alarm unit 154A configured to determine whether to issue an alarm on the basis of results of the comparison.

With this configuration, even if it is not assumed that the disturbance component is smaller than the whirling periodic component when eccentricity occurs, tool run-out can be detected without the need to add a sensor for detecting tool run-out.

3. Third Embodiment

Figure 10:
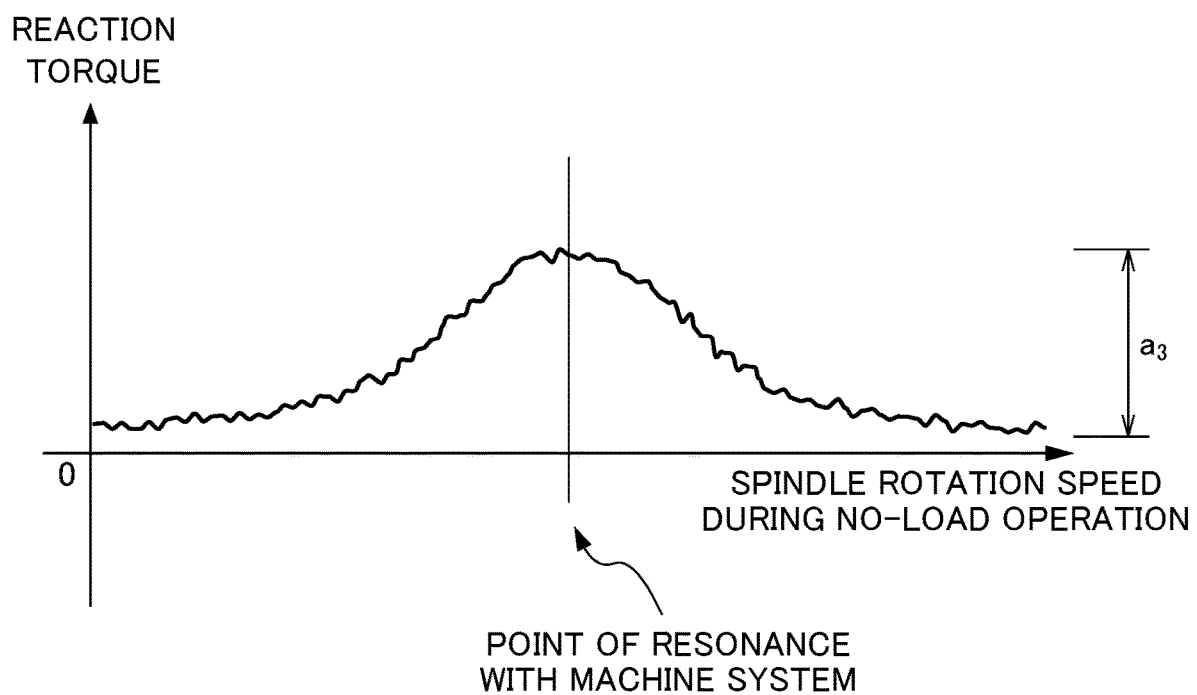
FIG. 10 is a graph showing the relationship between rotation speed of the spindle during a no-load operation and reaction torque according to one embodiment.

A third embodiment of the present invention will be described below with reference to FIG. 10. FIG. 10 is a graph showing the relationship between the value of reaction torque and the rotation speed of the spindle 111 during a no-load operation according to the present embodiment.

3.1. Outline of Invention

First, an outline of the invention according to the third embodiment will be described. There may also be a case where machining is affected because eccentricity and reaction torque are small but it is difficult to detect the reaction torque because the reaction force is hidden by disturbance. In such a case, reaction torque when eccentricity is small can be emphasized by using a point of resonance based on the rigidity in the mechanical system that supports the spindle 111 and a resonance phenomenon that uses rotation of eccentricity as excitation.

More specifically, in FIG. 10, when the spindle rotation speed during a no-load operation is made to agree with the point of resonance with the machine system, the value of a rotation speed periodic component in the reaction torque reaches a peak value. This value can be used to emphasize the reaction torque by using the spindle rotation speed during a no-load operation as the point of resonance at which resonance occurs.

3.2. Configuration and Operation of Invention

The configuration itself of the machine tool according to the third embodiment is generally the same as the machine tool 10 according to the first embodiment and the machine tool 10A according to the second embodiment, and hence a description thereof will be omitted.

In the first and second embodiments, the rotation speed of the spindle motor 112 and/or the moving shaft motor 117 controlled by the motor control circuit 130 is a constant value, but in the third embodiment, the rotation speed is a point of resonance at which resonance occurs.

When using the rotation speed of the spindle as the point of resonance, the point of resonance may be found in advance and the rotation speed of the spindle during a no-load operation may be made to agree with the point of resonance. Further, the rotation speed may be made to fluctuate between a low rotation speed and a high rotation speed that is expected to include the point of resonance, and the value measured within that section may be compared to a threshold value based on $a_3$ illustrated in FIG. 10 to agree with the point of resonance.

3.3. Effects of Invention

In the present embodiment, the rotation speed of the spindle 111 during a no-load operation is the rotation speed at which resonance occurs in the machine tool 10 or 10A.

With this configuration, even if the reaction force is hidden by disturbance and reaction torque is difficult to detect, tool run-out can be detected without the need to add a sensor for detecting tool run-out.

4.1. Outline of Invention

First, an outline of the invention according to a fourth embodiment will be described. In the third embodiment, a point of resonance is basically grasped in advance, and then a spindle rotation speed during a no-load operation is made to agree with the point of resonance. On the other hand, a point of resonance may be changed by a difference in rigidity between machine systems or by a tool type attached to a machine system. In such a case, grasping a point of resonance in advance may become difficult.

Figure 11:
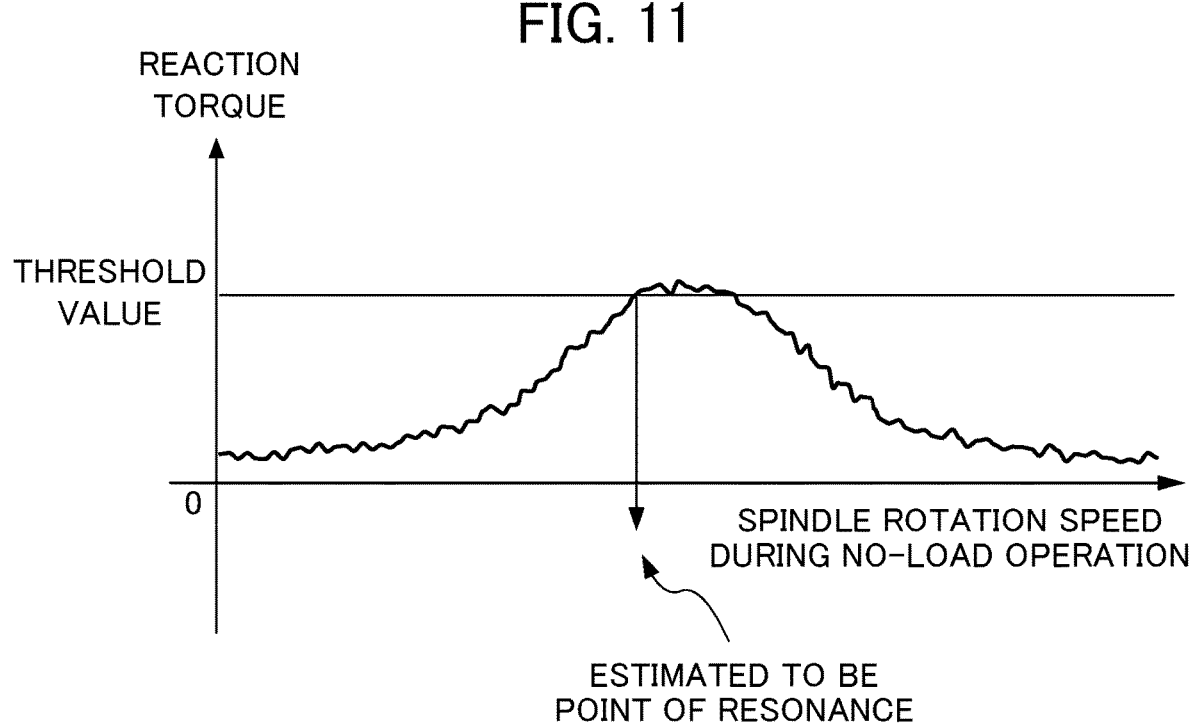
FIG. 11 is a graph showing the relationship between rotation speed of the spindle during a no-load operation and reaction torque according to one embodiment.

In this regard, as shown in FIG. 11, while a spindle rotation speed during a no-load operation is increased from a low rotation speed to a high rotation speed, the value of a rotation speed periodic component in reaction torque is compared to a threshold value greater than the value of a rotation speed periodic component in a normal state, and a point at which the threshold value is exceeded is estimated to be a peak. Then, a reference value and driving torque at a rotation speed at the time when the value of the rotation speed periodic component in the reaction torque has reached the peak are compared, and whether to issue an alarm is determined on the basis of a result of the comparison.

4.2. Configuration and Operation of Invention

The configuration itself of a machine tool according to the fourth embodiment is generally the same as the machine tool 10 according to the first embodiment and the machine tool 10A according to the second embodiment, and hence a description thereof will be omitted.

In the first and second embodiments, the rotation speed of the spindle motor 112 and/or the moving shaft motor 117 controlled by the motor control circuit 130 is a constant value. In the third embodiment, this rotation speed is a point of resonance at which resonance occurs. In the fourth embodiment, the rotation speed of the spindle motor 112 and/or the moving shaft motor 117 controlled by the motor control circuit 130 is made to fluctuate from a low rotation speed to a high rotation speed, and a reference value and driving torque at a rotation speed at the time when the value of a rotation speed periodic component in reaction torque is estimated to have reached a peak are compared.

If there are two or more points each estimated to be a peak, a point of the highest value of the rotation speed periodic component in the reaction torque is estimated to be a peak.

After a rotation speed at the time when the value of the rotation speed periodic component is estimated to have reached a peak is established, the established rotation speed may be stored into a storage unit (not shown) for each tool type. By doing so, during a second measurement and its subsequent measurements, a reference value and driving torque can be measured using a spindle rotation speed fixed from the first to a rotation speed linked with a tool.

4.3. Effects of the Invention

In the present embodiment, while the rotation speed of the spindle 111 during a no-load operation is increased from a low rotation speed to a high rotation speed, a rotation speed at which resonance occurs is estimated.

With this configuration, even if a point of resonance is not known in advance, tool run-out can be detected without the need to add a sensor for detecting tool run-out.

5. Fifth Embodiment

Figure 12:
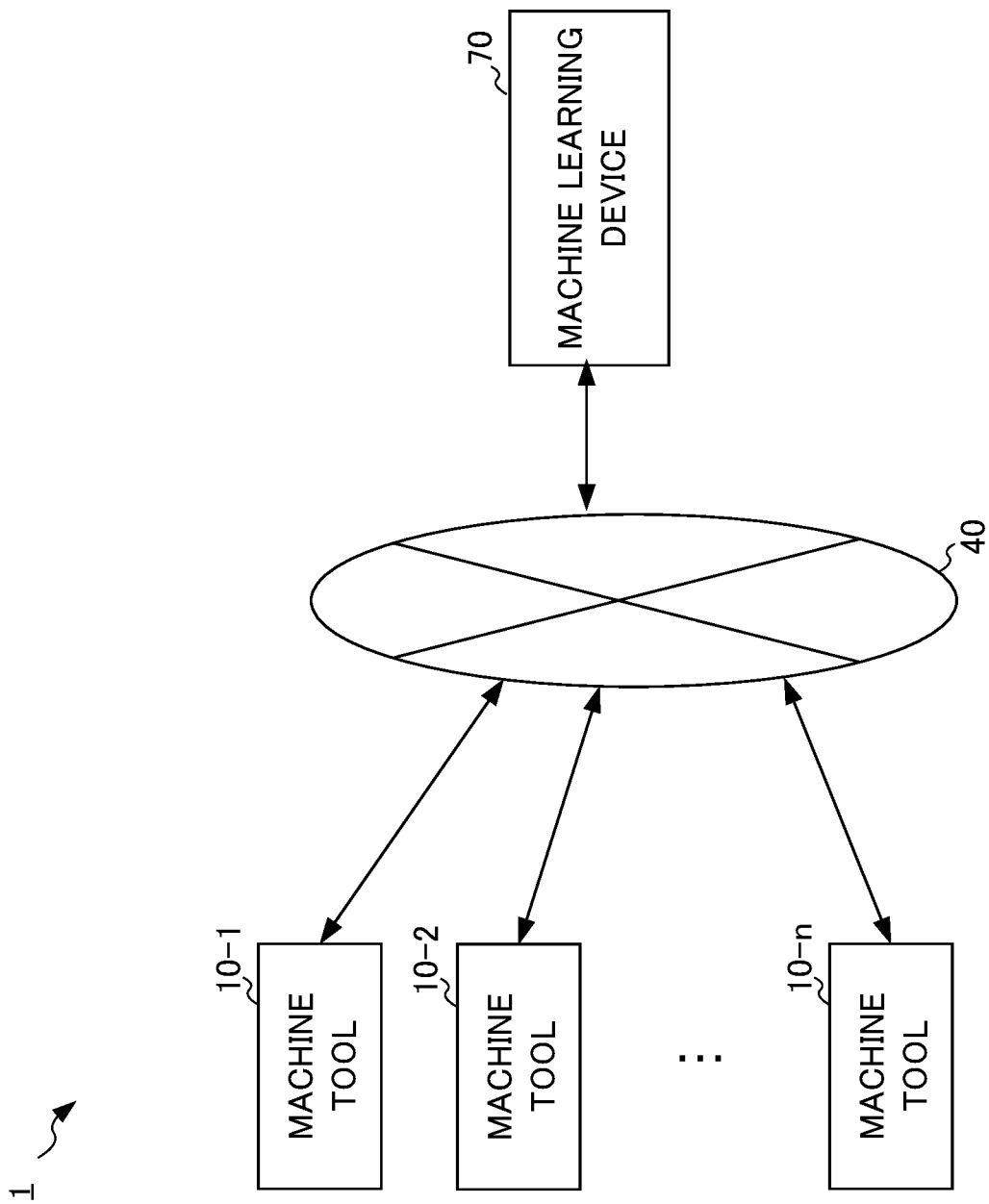
FIG. 12 is a diagram for illustrating the entire configuration of a machining system according to one embodiment.

A fifth embodiment of the present embodiment will be described with reference to FIGS. 12 to 14. FIG. 12 is a diagram illustrating the entire configuration of a machining system 1 according to the present embodiment. FIG. 13 is primarily a functional block diagram of a machine learning device 70 included in the machining system 1. FIG. 14 is a flowchart illustrating operation of the machine learning device 70.

5.1. Outline of Invention

In the first to fourth embodiments, data itself on the driving torque or the value of the frequency component extracted from the driving torque data is compared between normal operation and irregular operation and, during irregular operation, an alarm is issued. In the fifth embodiment, machine learning using teaching data is employed. This teaching data is made up of data in which driving torque during normal operation and a label indicating that the cutting tool 12 in the machine tool 10 is mounted correctly are made a pair, and data in which driving torque when an abnormality is intentionally created and a label indicating that the cutting tool 12 in the machine tool 10 is mounted incorrectly are made a pair. That is, "supervised learning" is performed. A learning model is created through supervised learning and this learning model is used to determine the mounted state of the cutting tool 12 and whether to issue an alarm on the basis of the results of the determination.

5.2. Configuration of Invention

As illustrated in FIG. 12, the machining system 1 includes a machine learning device 70 and n-number of machine tools 10 (where n is a natural number).

The machine learning device 70 and the machine tools 10 are communicably connected to each other. The machine learning device 70 and the machine tools 10 may be directly connected to each other via a connection interface, or they may be connected each other via a network 40. The network 40 may be a local area network (LAN) installed in a factory, the Internet, a public telephone network, or a combination of any of these networks. The specific communication method in the network 40 may be wired communication or wireless communication and is not particularly limited.

The machine learning device 70 employs supervised machine learning to create a learning model for detecting an abnormal mounted state of the cutting tool 12 in the machine tool 10. In order to achieve this, as illustrated in FIG. 12, the machine learning device 70 includes an input unit 71, a label acquisition unit 72, a learning unit 73, and a learning model storage unit 74.

The input unit 71 acquires data related to driving torque as a feature value from the machine tool 10. The label acquisition unit 72 acquires labels indicating that the cutting tool 12 in the machine tool 10 is mounted correctly or incorrectly.

The learning unit 73 performs supervised learning using pairs of feature values and labels as teaching data to create a learning model for detecting whether the cutting tool 12 in the machine tool 10 is mounted correctly or incorrectly, and the created learning model is sent to the control unit 150 of the machine tool 10.

The learning model storage unit 74 stores the learning model created by the learning unit 73.

The learning unit 73 may use a support vector machine (hereinafter referred to as "SVM") as an example. An SVM is known technology and will not be described in detail herein. SVM is one identification technique that uses supervised learning (learning in which a computer is given correct data and incorrect data as teaching data) and is known as a learning model with high identification accuracy. For example, an SVM is known to achieve high identification accuracy (high generalization ability) with unlearned data.

The learning unit 73 uses binarized labels relating to the mounted state of the cutting tool 12 for the labels described above and calculates a hyperplane that separates the space including the above-described feature value such that margins are at a maximum in terms of whether the cutting tool 12 is mounted correctly or incorrectly. Further, the learning unit 73 can use a coefficient of the hyperplane as a parameter of the learning model used by the machine tool 10 to determine the mounted state of the cutting tool 12.

As described above, the learning model storage unit 74 stores the learning model created by the learning unit 73.

5.3. Operation of Invention

FIG. 14 is a flowchart illustrating operation of the machine learning device 70 when machine learning is performed. In Step S31, the input unit 71 of the machine learning device 70 acquires the feature values from the machine tool 10. More specifically, the input unit 71 of the machine learning device 70 acquires driving torque data when the cutting tool is mounted correctly and driving torque data when the cutting tool is mounted incorrectly.

In Step S32, the label acquisition unit 72 of the machine learning device 70 acquires labels indicating whether the cutting tool is mounted correctly or incorrectly.

In Step S33, the learning unit 73 of the machine learning device 70 receives a pair of a feature value and a label as teaching data.

In Step S34, the learning unit 73 of the machine learning device 70 performs machine learning using the teaching data.

In Step S35, the learning unit 73 of the machine learning device 70 determines whether to end or repeat the machine learning. The condition of ending the machine learning may be arbitrarily determined. For example, the machine learning may be ended when the machine learning has been performed a predetermined number of times.

If the machine learning is to be repeated, the processing returns to Step S31 and the machine learning device 70 performs the same operation. If the machine learning is to be ended, in Step S36, the machine learning device 70 sends the learning model created by machine learning up to that point to each machine tool 10 via the network 40.

The learning model storage unit 74 of the machine learning device 70 stores the learning model. With this configuration, if a newly installed machine tool 10 requests the learning model, the learning model can be sent to that machine tool 10. Further, if new teaching data is acquired, additional machine learning can be performed on the learning model.

5.4. Effects of Invention

In the present embodiment, the learning model created through machine learning can be shared between a plurality of machine tools 10.

6. Other Embodiments

The above-described embodiments are preferred embodiments of the present invention. However, these embodiments are not intended to limit the scope of the present invention and the present invention may be implemented in various ways without departing from the gist of the present invention.

6.1. Modification Example 1

The machining system according to the fourth embodiment includes the machine learning device 70 and the n-number of machine tools 10 according to the first embodiment, but the machining system is not limited thereto. For example, in place of the n-number of machine tools 10, the machining system may include the machine tool 10A according to the second embodiment or the machine tool 10 or 10A according to the third embodiment.

If using the machine tool 10A, the input unit 71 of the machine learning device 70 acquires the value of the frequency component in place of the data on driving torque as the feature value from the machine tool 10.

Further, the machine learning device 70 may be incorporated into the machine tool 10 or 10A to integrate the machine tool 10 or 10A and the machine learning device 70.

6.2. Modification Example 2

In the first embodiment, the torque measurement unit 151 measures the driving torque of the moving shaft 116, but the torque measurement unit 151 is not limited thereto. For example, the torque measurement unit 151 may measure holding torque in place of the moving shaft 16 when each shaft is in a stationary state. The holding torque is obtained by adding whirling torque to static friction torque.

6.3. Modification Example 3

In Modification Example 2, there may be a case where reaction force is measured while the moving shaft is stationary, but reaction force may be difficult to measure due to a static friction torque component in the moving shaft driving system. As a result, in Modification Example 3, the torque measurement unit 151 may use driving torque during low speed movement at, for example, 100 mm/sec in place of the driving torque of the moving shaft 116 or holding torque when the shafts are stationary. The driving torque in this case is obtained by adding whirling torque to dynamic friction torque instead of static friction torque. In some cases, it is easier to detect the reaction force component when the dynamic friction component becomes dominant by slowly moving the moving shaft.

EXPLANATION OF REFERENCE NUMERALS

1 Machining system
10, 10A Machine tool
40 Network
70 Machine learning device
71 Input unit
72 Label acquisition unit
73 Learning unit
74 Learning model storage unit
111 Spindle
113 Spindle motor
116 Moving shaft
117 Moving shaft motor
130 Motor control circuit
131A, 131B Motor driving amp
150, 150A Control unit
151 Torque measurement unit
152, 152A Reference value calculation unit
153 Torque comparison unit
154, 154A Alarm unit
155 Frequency component extraction unit
156 Frequency component comparison unit

What is claimed is:

1. A machine tool for machining a workpiece, the machine tool comprising:
a spindle configured to rotate a holder mounted with a tool used for machining;
one or more moving shafts configured to move the holder and/or a work base on which the workpiece is placed;
a torque measurement unit configured to measure driving torque of the spindle and/or the one or more moving shafts;
a reference value calculation unit configured to use, as a reference value, the driving torque measured by performing a no-load operation by rotating the spindle in a normal state;
a torque comparison unit configured to compare, to the reference value, the driving torque measured by performing a no-load operation by rotating the spindle before actual machining; and
an alarm unit configured to determine whether to issue an alarm on the basis of results of the comparison.

2. The machine tool according to claim 1, wherein:
rotation speed of the spindle during the no-load operation is a constant value;
the reference value calculation unit uses a maximum value or run-out width of the driving torque during normal operation as the reference value; and
the torque comparison unit compares the maximum value of the driving torque or run-out width before machining to the reference value.

3. The machine tool according to claim 1, wherein:
rotation speed of the spindle during the no-load operation is a constant value; and
the torque measurement unit measures holding torque when each moving shaft is in a stationary state or the driving torque when each moving shaft moves at a speed equal to or less than a predetermined speed.

4. A machine tool for machining a workpiece, the machine tool comprising:
a spindle configured to rotate a holder mounted with a tool used for machining;
one or more moving shafts configured to move the holder and/or a work base on which the workpiece is placed;
a torque measurement unit configured to measure driving torque of the spindle and/or the one or more moving shafts;
a frequency component extraction unit configured to analyze the driving torque using FFT and extract a frequency component synchronized with rotation speed of the spindle;
a reference value calculation unit configured to use, as a reference value, a value of the frequency component extracted by performing a no-load operation by rotating the spindle in a normal state;
a frequency component comparison unit configured to compare, to the reference value, the value of the frequency component extracted by performing a no-load operation by rotating the spindle before actual machining; and
an alarm unit configured to determine whether to issue an alarm on the basis of results of the comparison.

5. The machine tool according to claim 1, wherein the rotation speed of the spindle during the no-load operation is a rotation speed at which resonance occurs in the machine tool.

6. The machine tool according to claim 1, wherein the rotation speed of the spindle during the no-load operation is a rotation speed at the time when the value of a rotation speed periodic component in reaction torque of the spindle is estimated to have become a peak value while the rotation speed of the spindle is made to fluctuate from a low rotation speed to a high rotation speed.

7. The machine tool according to claim 6, further comprising a storage unit that stores the rotation speed at the time when the value of the rotation speed periodic component in the reaction torque of the spindle is estimated to have become the peak value for each type of the tool, wherein
the rotation speed of the spindle during the no-load operation is the rotation speed stored in the storage unit.

8. A machining system comprising:
one or more of the machine tools in claim 1; and
a machine learning device including:
a label acquisition unit configured to acquire data indicating whether the tool in the machine tool is mounted correctly or incorrectly as labels; and
a learning unit configured to create a learning model for identifying a mounted state of the tool by performing supervised learning using, as teaching data, the driving torque measured when the tool is mounted correctly and a label indicating that the tool is mounted correctly as a pair, and the driving torque measured when the tool is mounted incorrectly and a label indicating that the tool is mounted incorrectly as a pair.

9. The machining system according to claim 8, wherein the machine learning device is incorporated into the machine tool to integrate the machine learning device and the machine tool.

\* \* \* \* \*